July 21, 1964 D. E. SIMMONS 3,141,550

REWINDER AND TAPE LOCK

Filed May 28, 1962

INVENTOR

Donald E. Simmons by Sherman Levy Attorney

United States Patent Office 3,141,550

Patented July 21, 1964

3,141,550
REWINDER AND TAPE LOCK

Donald Edward Simmons, 397 Meadowbrook Drive NE., Atlanta 5, Ga., assignor, by direct and mesne assignments, of 1/10 to Brian R. Carney, Nashville, Tenn., 17.5/100 to Fred R. Sisk, Antioch, Tenn., 1/40 to O. B. Hofstetter, Jr., Nashville, Tenn., and 2.5 to Hazel Schoun, Nashville, Tenn.

Filed May 28, 1962, Ser. No. 198,004
7 Claims. (Cl. 206—53)

The present invention relates to a device for maintaining tapes, film strips or the like on a spool or reel whereby the tape on the reel will be prevented from accidentally unwinding from the reel.

The primary object of this invention is to provide a rewinder and tape lock which can be readily positioned in engagement with the tape on the reel, and wherein the rewinder and tape lock can also be conveniently and readily removed from the reel when desired or required, the rewinder and tape lock being constructed so that it can be readily inserted in position on the reel, and wherein there is provided on the rewinder and tape lock a small strip of material which may be velveteen or the like so as to help clean certain of the surfaces, the present invention being shaped to include a foot portion which is contoured or shaped to the contour or configuration of the tape on the reel so as to provide increased pressure area.

Still another object of the present invention is to provide a tape lock and rewinder which can be used in conjunction with various types of material or articles such as sound tape, 8 millimeter film or the like, and wherein the present invention is also adapted to be used on all sizes of tape, film and the like up to and including video tape.

Still another object is to provide such a tape lock and rewinder which is adapted to be made of a suitable material such as plastic and wherein the primary purpose of the present invention is to hold the tape firmly and tightly in place, and wherein the present invention is constructed so that the same can be conveniently locked on or unlocked from the spool or reel, and wherein the present invention is also adapted to be used for conveniently rewinding tape without the need of touching the tape or film with the hands, the present invention having an area or space thereon which is adapted to be used for receiving indicia or writing thereon so that identification of the tape will be greatly facilitated.

Still another object is to provide such a rewinder and tape lock that is economical to manufacture and efficient in operation, and which is rugged in structure and foolproof in use.

These and other objects of the invention will become apparent from a reading of the following specification and claims, together with the accompanying drawing, wherein like parts are referred to and indicated by like reference characters and wherein:

Figures 1, 3:
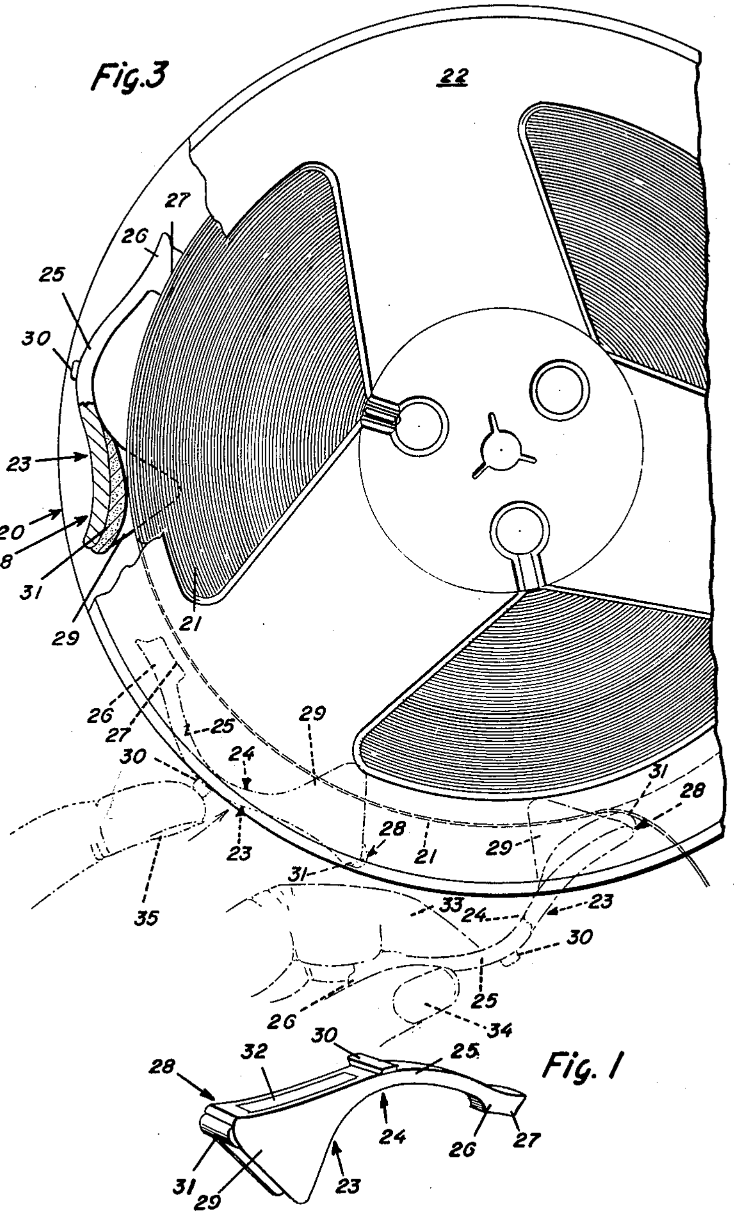
FIG. 1 is a perspective view of the rewinder and tape lock of the present invention.
FIG. 3 is a side elevational view, with parts broken away and in section, showing the present invention being used.

Referring in detail to the drawings, the numeral 20 indicates a conventional spool or reel which is adapted to have tape, film or the like wound thereon as indicated by the numeral 21, FIG. 3, and the reel 20 includes the usual spaced parallel side portions 22.

According to the present invention there is provided a rewinder and tape lock which is indicated generally by the numeral 23, and the rewinder and tape lock 23 is shaped to include a body member or body portion 24 which is adapted to be made of a suitable material such as a suitable plastic.

As shown in the drawings the body member embodies or comprises an arcuate portion or section 25 which has an enlargement 26 on one end thereof which defines or provides a foot, and the foot 26 is slightly recessed or contoured as at 27 so as to conform to the contour of the tape 21 on the reel 20.

The body member 24 is further provided with a head portion 28 which is beveled and narrowed slightly for a purpose to be later described, and the head portion 28 includes a pair of spaced parallel generally triangular side sections 29, FIG. 1.

Formed integral with the outer portion of the arcuate section 25 is an enlarged shoulder or projection 30 which defines a lock.

The numeral 31 indicates a strip of yieldable material such as velveteen which is suitable affixed as for example by means of an adhesive to the head portion 28, and the strip of material 31 is interposed between the side sections 29 as shown in the drawings.

The head portion 28 has a space 32 thereon which is adapted to receive writing or other indicating markings or indicia so as to aid in determining the subject matter on the tape or film 21.

From the foregoing, it will be seen that there has been provided a rewinder and tape lock which is especially suitable for use in retaining or maintaining tape or film as indicated by the numeral 21 on a reel or spool such as the reel indicated by the numeral 20.

In use, with the parts arranged as shown in the drawings, with the tape 21 wound on the reel 20 in the usual manner, it will be seen that with the device 23 of the present invention positioned as shown in solid lines in FIG. 3, the tape 21 will be maintained properly wound on the reel 20 so that accidental or inadvertent unwinding of the tape 21 will be prevented.

When it is desired to remove or unwind the tape from the reel, the device 23 can be readily moved to a position so as to permit unwinding or removal of the tape 21 from the reel 20 in the desired manner.

The parts can be made of any suitable material and in different shapes or sizes.

The head portion 28 has a beveled narrowed construction which facilitates entrance or insertion thereof into the reel.

The strip 31 which is adapted to be made of velveteen or the like provides a cleaning surface and also serves to insure that there will be a smooth carriage for the underside of the lock.

The foot portion 26 is slightly recessed as at 27 so as to conform to the contour of the tape 21 on the reel 20 and this construction provides increased pressure area. This is entirely inside of the reel and does not protrude beyond the edge of the reel such as a plastic reel, and also sinks below the rim of the reel without any protrusion.

The tape lock and rewinder can be used for sound tape, 8 millimeter film or the like. By changing the dimensions thereof, the device can be used on all sizes of tape, film, and it can also be used on video tape or the like.

Figure 4:
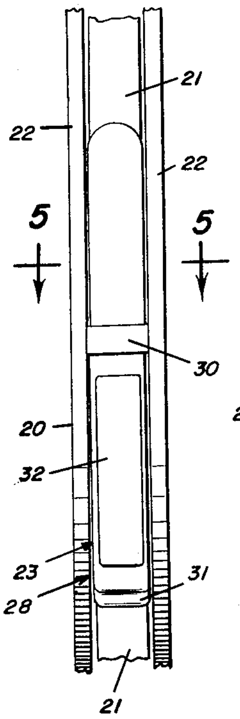
FIG. 4 is a view taken at right angles to the view shown in FIG. 3.
Figure 5:
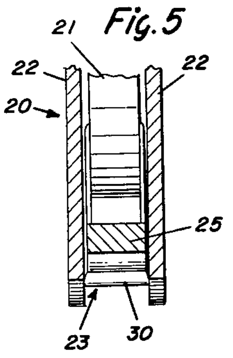
FIG. 5 is a sectional view taken on the line 5—5 of FIG. 4.
Figure 2:
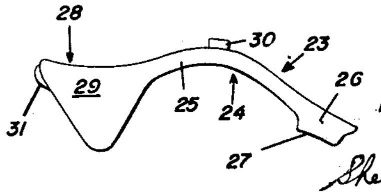
FIG. 2 is a side elevational view thereof.

The present invention includes the member 23 which is adapted to be molded of a suitable plastic material, and the purpose thereof is that, when placed on the spool and pushed down as for example to the position shown in solid lines in FIG. 3, the device will be locked in place so as to hold the tape firmly and tightly in place. This locking action occurs due to the provision of the shoulder 30 which has a length that is slightly greater than the width of the adjacent portion of the arcuate section 25, as for example as shown in FIGS. 4 and 5 so that the shoulder 30 will snugly engage the inner surfaces of the sides 22 in order to provide the desired locking action within the reel.

Furthermore, by pushing on an end such as the end portion 28, the other end of the device will be raised up where it can be conveniently grasped or gripped by the fingers and this also unlocks it from the spool or reel, but it will still be held by the spool and in this position, by just pushing it forward by the handle, it will rewind tape without having to touch the tape or film with the hands. In FIG. 3 in broken lines, the numerals 33 and 34 indicate the position of the fingers gripping the device and illustrating the use thereof in rewinding the tape without the necessity of touching the tape or film with the fingers or hands.

When the user has finished rewinding, by applying a slight finger pressure as for example by means of the finger illustrated by the numeral 35 in broken lines in FIG. 3, and wherein by applying slight finger pressure from the finger 35 on the top of the device, the handle will push down so that the tape will be securely locked in place so that it can be placed in a can or box and filed away or stored.

In addition, there is provided on top of the rewinder and lock a space as indicated by the numeral 32 which provides a convenient area for a description of the tape contents, and since this will follow the tape onto various spools, the user will be able to know at all times what each tape consists of from the top of the clip.

It will therefore be seen that the present invention rewinds tape or film, and also locks and holds the tape in position on the spool, and shows at a glance what tape matter consists of from the label.

In FIG. 3 the device 23 of the present invention is shown being held or gripped by fingers such as the fingers 33 and 34 wherein the device is in position or in the operation of rewinding the tape. Also in FIG. 3 the device 23 is shown in solid lines in locking position. The lock and rewinder of the present invention fits inside of the tape spool. Pressure on the tape at the point 27 serves to lock the tape on the spool firmly, and locking pressure on the tape is also exerted at the point 31, as shown in FIG. 3, and this arrangement serves to insure that the tape will be locked firmly on the spool.

Preferably the device 23 is made in contrasting colors so as to facilitate quick location thereof for immediate use.

The tape or surface 32 can be conveniently written on as, for example, so as to facilitate cataloging of the tape, and the rewinder and lock follows the tape throughout the tape's operation. Also as shown in FIG. 3 finger pressure may be applied as, for example, to the point 30 by means of a finger such as the finger 35 in order to move the device into a position so that it exerts a firm locking action. Also, finger pressure is adapted to be exerted or applied to the head portion 28 for releasing the device 23, as previously stated.

Minor changes in shape, size and rearrangement of details coming within the field of invention claimed may be resorted to in actual practice, if desired.

What is claimed is:

1. As a new article of manufacture, a rewinder and tape lock comprising a member having a locking portion thereon intermediate the ends thereof, a foot portion on one end of the member, and a head portion on the other end of the member, said foot portion being recessed slightly to conform to the contour of the tape on a reel, said head portion including a pair of generally triangular spaced parallel side sections which are integral with the head portion.

2. As a new article of manufacture, a rewinder and tape lock comprising a member having a locking portion thereon intermediate the ends thereof, a foot portion on one end of the member, and a head portion on the other end of the member, said foot portion being recessed slightly to conform to the contour of the tape on a reel, said head portion including a pair of spaced parallel integral side sections, and said head portion having a space thereon for receiving indicia.

3. In a rewinder and tape lock for a reel or spool of the type that is adapted to have tape wound thereon, and wherein said reel includes spaced parallel side portions, said rewinder and tape lock comprising a body member which is shaped to include an arcuate portion that has an enlargement on one end which defines a foot, said body member further including a head portion, and said head portion including a pair of spaced parallel side sections, and a shoulder on said arcuate portion and said shoulder defining a lock.

4. The structure as defined in claim 3 and further including a strip of yieldable material affixed to said head portion and arranged between said side sections.

5. The structure as defined in claim 3 wherein said foot is contoured and recessed slightly to conform to the contour of the tape on the reel.

6. The structure as defined in claim 3 wherein said head portion is beveled and narrowed slightly.

7. A rewinder and tape lock for a reel of the type that is adapted to have tape wound thereon, said reel including spaced parallel side portions, said rewinder and tape lock comprising a body member made of plastic and shaped to include an arcuate portion which has an enlargement on one end that defines and provides a foot that is contoured and recessed slightly to conform to the contour of the tape on the reel, said body member further including a head portion which is beveled and narrowed slightly, said head portion including a pair of spaced parallel generally triangular side sections, said side sections being of the same size, and said side sections being arranged so that they are of maximum size at points contiguous to the head portion, a shoulder on said arcuate portion and said shoulder defining a lock, a strip of yieldable material affixed to said head portion and said strip being arranged between said side sections, said strip of material having a length that is substantially equal to the width of the adjacent portions of the side sections, said shoulder being arranged on the opposite side of said body member from said side sections, said head portion having a space thereon for receiving indicia, said indicia receiving space being arranged on the opposite side of the body member from the side sections, the length of the lock being slightly greater than the width of the arcuate portion, and wherein said lock snugly engages the inner surfaces of the side portions of the reel.

References Cited in the file of this patent

UNITED STATES PATENTS 2,174,049 Werner ---------------- Sept. 26, 1939

FOREIGN PATENTS 896,770 France ---------------- May 8, 1944

1,092,715 France ---------------- Nov. 10, 1954